United States Patent [19]

Marion et al.

[11] 4,006,099

[45] Feb. 1, 1977

[54] MANUFACTURE OF GASEOUS MIXTURES COMPRISING HYDROGEN AND CARBON MONOXIDE

[75] Inventors: Charles P. Marion, Mamaroneck, N.Y.; William B. Crouch, Whittier, Calif.

[73] Assignee: Texaco Inc., New York, N.Y.

[22] Filed: June 16, 1975

[21] Appl. No.: 587,191

[52] U.S. Cl. .................................. 252/373; 48/215
[51] Int. Cl.² .......................................... C01B 2/14
[58] Field of Search ............. 252/373; 48/215, 214

[56] References Cited

UNITED STATES PATENTS

| | | | |
|---|---|---|---|
| 3,545,926 | 12/1970 | Schlinger et al. | 252/373 |
| 3,705,108 | 12/1972 | Marion et al. | 252/373 X |
| 3,743,606 | 7/1973 | Marion et al. | 252/373 |
| 3,758,037 | 9/1973 | Marion et al. | 252/373 X |
| 3,847,564 | 11/1974 | Marion et al. | 252/373 X |

*Primary Examiner*—Howard T. Mars
*Attorney, Agent, or Firm*—Whaley, T. H.; C. G. Ries; Albert Brent

[57] ABSTRACT

In the subject partial oxidation process for the continuous production of gaseous mixtures comprising hydrogen and carbon monoxide separate streams of a free-oxygen-containing gas are simultaneously passed through the center conduit and through the outer annular passage of a double-annulus-type burner while a liquid hydrocarbonaceous feedstock, optionally in admixture with a temperature moderator, is simultaneously passed through the intermediate annular-passage. In one embodiment, a dispersion of petroleum oil in steam is passed through the intermediate annular passage of the burner at a velocity which is greater than the velocity of the two separate streams of oxygen which are passed respectively through the central conduit and through the outer annular-passage. Combustion efficiency may be thereby improved.

2 Claims, No Drawings

MANUFACTURE OF GASEOUS MIXTURES COMPRISING HYDROGEN AND CARBON MONOXIDE

BACKGROUND OF THE INVENTION

1. Field of the Invention

This invention relates to a continuous process for the generation of gaseous mixtures comprising $H_2$, CO, and other constituents by partial oxidation of a liquid hydrocarbonaceous feedstock. The gaseous mixtures are suitable for use as synthesis gas, reducing gas or fuel gas.

2. Description of the Prior Art

Single and double annulus-type burners have been used previously for introducing streams of reactants into a partial-oxidation synthesis-gas generator. For example, in coassigned U.S. Pat. No. 3,545,926 - Schlinger et al, an oil stream is disclosed being passed through the central conduit of a single annulus-type burner at a velocity in the range of about 5 to 40 feet per second and a converging annular stream of oxygen and steam is discharged through the annulus at a velocity of about 200 to 400 feet per second. In coassigned U.S. Pat. No. 3,743,606 - Marion et al, an oil stream is disclosed being passed through the central conduit of a double annulus-type burner at a velocity of 10–100 feet per second, a free-oxygen containing gas is passed through the inner annulus at a velocity of from 110 ft. per sec. up to sonic velocity, and a temperature-moderating gas is passed through the outer annulus at 55 ft. per sec. to sonic velocity.

SUMMARY

The combustion efficiency in the noncatalytic partial-oxidiation process, for making gaseous mixtures comprising $H_2$, CO, $CO_2$, $H_2O$, particulate carbon and optionally impurities selected from the group consisting of $CH_4$, COS, $H_2S$, A, $N_2$, and mixtures thereof, is substantially increased by continuously passing through the central conduit and the outer annular passage of a double-annulus-type burner separate streams of free-oxygen-containing gas while simultaneously passing through the intermediate annular passage of said burner a stream of liquid hydrocarbonaceous feedstock optionally in admixture with a temperature moderator e.g. $H_2O$ or $CO_2$; impinging said reactant streams together in the reaction zone of a noncatalytic, free-flow gas generator so as to produce a mixture of atomized hydrocarbonaceous material and gaseous oxidant in which the ratio of atoms of free oxygen in the oxidant to atoms of carbon in the hydrocarbonaceous feed is in the range of about 0.8 to 1.35; and reacting said mixture by partial oxidation at an autogenous temperature in the range of about 1500 to 3500° F and at a pressure in the range of about 1 to 250 atmospheres to produce said gaseous mixture.

In one embodiment of the invention in which a dispersion of liquid hydrocarbonaceous feed and steam is passed through the intermediate annular passage of the burner and separate streams of substantially pure oxygen are passed through the central conduit and through the outer annular passage respectively, the combustion efficiency of the process is maximized by maintaining the stream of liquid hydrocarbonaceous fuel-steam dispersion at a greater velocity than that of the two oxygen streams. For example, separate streams of substantially pure oxygen may be passed through the center conduit and simultaneously through the outer annular passage of the double-annular-type burner at a velocity in the range of about 300 to 990 feet per second; simultaneously, a stream of petroleum oil dispersed in steam is continuously passed through the intermediate annular passage at a velocity in the range of about 650 to 1100 feet per second but at a greater velocity than that of either or both of the other two streams; the ratio of atoms of oxygen in the oxidant streams to atoms of carbon in the feedstock is suitably in the range of about 0.94 to 1.05; and the weight ratio steam to hydrocarbonaceous feedstock is in the range of about .05 to 5. Impact of the streams in the reaction zone produces efficient and thorough mixing and reaction. Reaction takes place at a temperature in the range of about 1500° to 3500° F and a pressure in the range of about 1 to 250 atmospheres. By this mode of operation, combustion efficiency is improved and the amount of particulate carbon in the effluent gas stream leaving the gas generator is in the range of about 0.2 to 5.7 weight percent (basis weight of carbon in the generator feed).

DESCRIPTION OF THE INVENTION

The method of the invention is generally applicable to double-annulus-type burner construction known for use in the partial oxidation of hydrocarbonaceous fuels with oxygen. These burners mix the separate streams of reactants together to produce a mixture which is then reacted by partial oxidation in the reaction zone of the gas generator. The burners consist in general of a plurality of concentrically arranged tubes. Reference is made to coassigned U.S. Pat. No. 3,545,926 - Schlinger et al showing a typical free-flow synthesis-gas-generator with a suitable axially aligned burner mounted in the upper head.

In the preferred embodiment of our invention, the mixer-burner comprises a central cylindrical conduit with an upstream flanged inlet for introducing a portion of the free-oxygen-containing gas required in the partial-oxidation reaction. The downstream tip of the central conduit is preferably shaped into a converging conical nozzle. Surrounding said central conduit is an intermediate coaxial conduit with an upstream flanged inlet for introducing mixtures of liquid hydrocarbonaceous feed, optionally in admixture with a temperature moderator, having a converging frustoconically-shaped nozzle at the downstream tip. Said inner conduit is longitudinally and radially spaced from said central conduit to provide an intermediate annularly-shaped conduit therebetween for the free passage of said mixture of hydrocarbonaceous feed and moderating gas. Surrounding said intermediate conduit is an outer coaxial conduit with an upstream flanged inlet for introducing the remainder of the free-oxygen-containing gas required in the partial-oxidation reaction and with a converging frustoconically-shaped nozzle at the downstream tip. Said outer conduit is longitudinally and radially spaced from said intermediate conduit so as to provide an outer annularly-shaped passage therebetween for the free passage of said free-oxygen-containing gas. Optionally, a water-jacketed face plate may be provided at the burner tip to cool the outer converging nozzle, as shown in coassigned U.S. Pat. No. 3,847,564 - C. P. Marion and B. Reynolds. External flanges are provided for mounting the burner in the top of a vertical freeflow gas generator in coaxial alignment thereto. The tip of the burner extends to the upper end of the reaction zone.

The hydrocarbonaceous feedstream as a liquid phase or as a gaseous dispersion in temperature moderator is introduced through the intermediate annular passage. Simultaneously, all of the free-oxygen-containing gas required in the partial-oxidation reaction is supplied as two separate streams. One stream of free-oxygen-containing gas is passed through the center conduit while the remainder of the free-oxygen-containing gas is introduced through the outer annular passage. The reactant streams in the inner and outer annular passages converge at a conical angle e.g. 15° to 75° to the burner axis and impact with the remainder of the free-oxygen-containing gas stream being discharged from the central nozzle at the tip of the burner. As a result, the hydrocarbonaceous feedstock is first torn into ligaments and then atomized into fine droplets. The droplets form a mist downstream, finely dispersed in the free-oxygen-containing gas and temperature moderator, and of such minuteness as to provide an intimacy of contact favorable for subsequent oxidation.

When the hydrocarbonaceous feedstream is passed through the intermediate annulus in liquid phase, the suggested linear velocity of the burner tip is in the range of about 10 to 100 feet per second. The linear velocity of the free-oxygen-containing gas at the burner tip is then in the range of about 200 feet per second to sonic velocity in the other two passages. Optionally, a temperature-moderating gas may be mixed with one or both of said streams of free-oxygen containing gas.

When a mixture of atomized hydrocarbonaceous feed in temperature moderator e.g. steam, $CO_2$ etc. is passed through the intermediate annular passage, the linear velocity of the three separate streams at the burner tip may be in the range of about 100 feet per second to sonic velocity. Preferably, the linear velocity of the stream of hydrocarbonaceous feed-temperature moderator flowing in the intermediate annular passage is greater than the linear velocity of the two separate streams of free-oxygen-containing gas flowing respectively in the central conduit and the outer annular passage. For example, the velocity difference between the feed dispersion flowing at a higher velocity through the intermediate annular passage and that of either or both of the oxygen streams may be about 20 ft. per sec. or more.

In one embodiment of the subject process, the combustion efficiency for making synthesis gas, reducing gas, or fuel gas is substantialy improved; and the amount of entrained particulate carbon in the product gas stream may be reduced to a value in the range of about 0.2 to 5.7 weight percent (basis weight of carbon in the generator feed) by the following operating conditions: substantially pure oxygen is passed continuously through the center conduit and simultaneously through the outer annular passage of the double-annulus burner at a linear velocity in the range of about 300 to 990 feet per second, for example from about 635 to 990 ft. per sec. in the central conduit and 500 to 733 ft. per sec. in the outer annular passage; simultaneously petroleum oil dispersed in steam is passed continuously through the intermediate inner annular passage at a linear velocity in the range of about 650 to 1100 feet per second and at a greater velocity than that of the other two streams, for example at 871 to 1047 ft. per sec. and at least 20 ft. per sec. greater than either or both of the oxygen streams; upon impact of the three streams together in the reaction zone, a uniform dispersion of petroleum oil in steam and oxygen is produced.

The noncatalytic partial oxidation reaction takes place as the dispersion passes through the unobstructed free-flow refractory-lined reaction zone of the vertical steel pressure vessel. The reaction time is about 0.5 to 8 seconds. The autogenous temperature in the reaction zone is in the range of about 1500° to 3500° F and the pressure is in the range of about 1 to 250 atmospheres.

The effluent gas stream from the gas generator has the following composition in mole %: $H_2$ 30 to 70; CO 60 to 20; $CO_2$ 2 to 8; $H_2O$ 5–15; $CH_4$ nil to 15; $N_2$ nil to 65; $H_2S$ nil to 2.0; COS nil to 0.2; A nil to 2; and from 0.2 to 20 wt. % of particulate carbon (basis weight of C in the hydrocarbonaceous fuel).

The term liquid hydrocarbonaceous feed or material as used herein is intended to mean by definition petroleum distillate and residue, gas oil, residual fuel, reduced crude, whole crude, asphalt, coal tar, coal oil, shale oil, tar-sand oil, and mixtures thereof. An economic advantage is obtained when low-cost sulfur-containing petroleum oils having an I.B.P. in the range of 400° to 900° F or higher and with a sulfur content in the range of about 1 to 7 wt. % are used. Included also by definition as liquid hydrocarbonaceous feeds or materials are pumpable slurries of solid fuels e.g. coal, coal char, particualte carbon, petroleum coke, and mixtures thereof in water or a liquid hydrocarbonaceous material, such as one previously listed. Further, included also by definition as a liquid hydrocarbonaceous feed or material are liquid oxygenated hydrocarbonaceous materials i.e. liquid hydrocarbon materials containing combined oxygen, including alcohols, ketones, aldehydes, organic acids, esters, ethers, and mixtures thereof. Further, a liquid oxygenated hydrocarbonaceous material may be in admixture with one of said liquid petroleum materials.

The liquid hydrocarbonaceous feed may be introduced into the gas generator at a temperature in the range of ambient to 800° F, but below the decomposition temperature.

The term free-oxygen containing gas as used herein includes by definition air, oxygen-enriched air, i.e. greater than 21 mole % oxygen, and substantially pure oxygen, i.e. greater than 95 mole % oxygen (the remainder comprising $N_2$ and rare gases). Free-oxygen containing gas may be introduced into the burner at a temperature in the range of about ambient to 1800° F. The ratio of free oxygen in the oxidant to carbon in the feedstock (O/C atom/atom) is preferably in the range of about 0.6 to 1.5. Substantially pure oxygen is preferred to minimize introducing nitrogen and other gaseous impurities into the synthesis gas.

The term, temperature moderator, as used herein includes by definition $H_2O$, $CO_2$, flue gas, off-gas from an ore-reduction zone, a portion of cooled and recycled effluent gas from the synthesis-gas generator, and mixtures thereof. $H_2O$ is the preferred temperature moderator. The weight ratio of temperature-moderator/liquid-hydrocarbonaceous feed is in the range of about 0.05 to 5.0 and preferably about 0.15 to 0.4.

EXAMPLES

The following examples are offered as a better understanding of the present invention, but the invention is not to be construed as limited thereto.

EXAMPLE 1

Synthesis gas is generated in an unpacked free-flow refractory-lined reactor by the noncatalytic partial oxidation of fuel oil with substantially pure oxygen (95 mole % $O_2$ or higher) and steam. The internal volume of the combustion chamber of the gas generator is 63.4 cubic feet.

The fuel oil supplied to the synthesis-gas generator has the following characteristics:

| | |
|---|---|
| Gravity, ° API | 14.0 |
| Ultimate Analysis, Wt. percent | |
| Carbon | 85.8 |
| Hydrogen | 11.3 |
| Nitrogen | .8 |
| Sulfur | 1.9 |
| Oxygen | .1 |
| Heating Value, B.T.U./lb | 18430 |

In Run No. 1 a dispersion of fuel oil and steam at a temperature of 385° F is passed continuously through the intermediate annular passage of an annulus-type burner at a velocity of about 1042 feet per second. Simultaneously two separate streams of substantially pure oxygen at a temperature of 214° F are respectively passed continuously through the central conduit of the burner at a velocity of about 635 feet per second and through the outer annular passage of the burner at a velocity of about 647 feet per second. A summary of the operating conditions is shown in Table I below:

TABLE I

| | Run No. 1 |
|---|---|
| Feed Rates: | |
| Oil, lbs/hr | 414 |
| Oxygen (99 mole % $O_2$) SCFH | 5798 |
| Steam, lbs/hr | 150 |
| Steam/Oil, lbs/lb. | .36 |
| Oxygen/Oil, SCF/lb. | 13.95 |
| Oxygen/Carbon, atom/atom | 1.034 |
| Reaction Zone | |
| Temperature, ° F. | 2910 |
| Pressure, Psig | 32 |
| Product Gas Composition (Dry Mol %) | |
| Hydrogen | 46.13 |
| Carbon Monoxide | 48.50 |
| Carbon Dioxide | 4.80 |
| Hydrogen Sulfide | .41 |
| Carbonyl Sulfide | .04 |
| Methane | — |
| Nitrogen | — |
| Argon | .11 |
| Particulate Carbon Wt. % (basis C in Feed) | 1.50 |

EXAMPLE 2

For purposes of comparison, the linear velocities of the streams through the passages of the burner in Example 1 were varied as shown for Run Numbers 2–4 in Table II below. The product gas composition and operating conditions were somewhat the same as described previously for Example 1 Run No. 1. The ratio of atoms of oxygen in the oxidant streams per atom of carbon in the hydrocarbon stream in Run Numbers 1–4 was in the range of 1.000 to 1.034.

TABLE II

Velocity of Streams vs Entrained Carbon

| | | Velocity of Streams Through Burner | | |
|---|---|---|---|---|
| Run No. | Weight Percent Carbon | $O_2$ in Outer Annulus | Oil-Steam in Intermediate Annulus | $O_2$ in Central Conduit |
| 1 | 1.50 | 647 | 1042 | 635 |
| 2 | 2.30 | 533 | 1039 | 990 |
| 3 | 3.57 | 580 | 645 | 927 |
| 4 | 4.88 | 525 | 613 | 782 |

By comparing the weight-percent particulate carbon contained in the product gas for Run Numbers 1 to 4, the unexpectedly improved combustion efficiency for Run Numbers 1 and 2 in comparison with Run Numbers 3 and 4 becomes readily apparent. In Run Numbers 1 and 2 only, the linear velocity of the oil-stream passing through the intermediate annulus of the burner is greater than the linear velocity of the separate streams of substantially pure oxygen passing through the outer annular passage and the central conduit.

A reduction of carbon content in the effluent-gas stream from the gas generator shows an improved combustion efficiency. Further, in comparison with conventional processing the consumption of oxygen, in standard cubic feet per standard cubic foot (SCF) of product gas may be decreased about 2% by the subject process at a significant economic saving. Consumption of hydrocarbon feedstock per SCF of ($H_2$+CO) is also decreased by about 2%. Further, the carbon extraction facilities for recovering carbon from the water and feeding it back to the generator may be reduced in size.

The process of the invention has been described in general and by example, with reference to an oil feedstock of a particular composition, for purposes of clarity and illustration only. To those skilled in the art, it will be apparent from the foregoing that various modifications of the process and the materials disclosed herein can be made without departure from the spirit of the invention.

We claim:

1. In the manufacture of a product gas mixture comprising $H_2$ and CO, together with $CO_2$, $H_2O$, particulate carbon, and one or more materials from the group consisting of $CH_4$, COS, $H_2S$, A, and $N_2$ by the partial oxidation of a dispersion of petroleum oil and steam with a free-oxygen containing gas in the reaction zone of a free-flow noncatalytic gas generator at a pressure in the range of about 1 to 250 atmospheres and at an autogenous temperature in the range of about 1500° to 3500° F, wherein said reactants are introduced into the reaction zone of said gas generator by way of a double-annulus-type burner having a central cylindrical conduit, an intermediate coaxial conduit with a converging nozzle at the downstream tip of the burner, said intermediate conduit surrounding said central conduit and being longitudinally and radially spaced therefrom so as to provide an intermediate annular passage therebetween, and an outer coaxial conduit with a converging nozzle at the downstream tip of the burner, said outer conduit surrounding said intermediate conduit and being longitudinally and radially spaced therefrom so as to provide an outer annular passage therebetween; the improvement which comprises passing through said central conduit of said annulus-type burner a stream of free-oxygen containing gas comprising a portion of the total oxygen subsequently required in the reaction zone, simultaneously passing through said intermediate annular passage said stream of petroleum oil-steam dispersion; simultaneously passing through said outer annular passage a stream of free-oxygen containing gas comprising the remainder of the free-oxygen required in the reaction zone, wherein the linear velocities of said stream of free-oxygen containing gas are in the range of about 300 to 990 feet per second, and the linear velocity of said stream of petroleum oil-steam dispersion is in the range of about 650 to 1100 ft. per sec. and is at a higher velocity than either or both of said streams of free-oxygen containing gas; impinging said three streams together so as to produce a mixture in which the atomic ratio of free-oxygen in the oxidant to carbon in the petroleum oil is in the range of about 0.8 to 1.35; and reacting said mixture by partial oxidation at a temperature in the range of about 1500° to 3500° F and a pressure in the range of about 1 to 250 atmospheres to produce said product gas mixture.

2. The process of claim 1 in which said free-oxygen-containing gas is selected from the group consisting of air; oxygen-enriched air, i.e. greater than 21 mole % oxygen; and substantially pure oxygen, i.e. greater than about 95 mole % oxygen (the remainder comprising $N_2$ and rare gases).

* * * * *